US012431277B2

(12) United States Patent
Kautz et al.

(10) Patent No.: US 12,431,277 B2
(45) Date of Patent: Sep. 30, 2025

(54) GEOMETRICALLY STABLE NANOHENRY INDUCTOR

(71) Applicant: Honeywell Federal Manufacturing & Technologies, LLC, Kansas City, MO (US)

(72) Inventors: David Kautz, Shawnee, KS (US); Marcus Kautz, Arvada, CO (US); David Allendorfer, Olathe, KS (US); Jeremy Sims, Pleasant Hill, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/430,942

(22) Filed: Feb. 2, 2024

(65) Prior Publication Data

US 2024/0203636 A1 Jun. 20, 2024

Related U.S. Application Data

(63) Continuation of application No. 17/521,370, filed on Nov. 8, 2021, now Pat. No. 11,929,197.

(51) Int. Cl.

| | |
|---|---|
| ***H01F 27/28*** | (2006.01) |
| ***H01F 5/00*** | (2006.01) |
| ***H01F 27/40*** | (2006.01) |

(52) U.S. Cl.

CPC .............. *H01F 27/28* (2013.01); *H01F 5/00* (2013.01); *H01F 27/40* (2013.01)

(58) Field of Classification Search

CPC . H01F 27/28; H01F 5/00; H01F 27/40; H01F 17/0013

USPC .................................... 336/65, 83, 200, 232

See application file for complete search history.

(56) References Cited

U.S. PATENT DOCUMENTS

2010/0259352 A1* 10/2010 Yan ......................... H01F 5/003 336/200

2020/0066438 A1* 2/2020 Lee ......................... H01F 27/34

FOREIGN PATENT DOCUMENTS

JP 04184983 A * 7/1992

* cited by examiner

*Primary Examiner* — Tuyen T Nguyen

(74) *Attorney, Agent, or Firm* — Erise IP, P.A.

(57) ABSTRACT

Systems, methods, and devices are provided for producing and using a low-value inductor which is stable at high frequencies, the inductor including a plurality of radial spokes extending between two concentric rings. The inductance of the inductor is controlled by the number and dimensions of the plurality of spokes, as well as the materials of the inductor. In some cases, the inductor is used as a low value inductance standard for directly measuring a low value electrical inductance.

20 Claims, 8 Drawing Sheets

GEOMETRICALLY STABLE NANOHENRY INDUCTOR

RELATED APPLICATION

This patent application is a continuation application claiming priority benefit, with regard to all common subject matter, of U.S. patent application Ser. No. 17/521,370, filed Nov. 8, 2021, and entitled "GEOMETRICALLY STABLE NANOHENRY INDUCTOR." The above-referenced application is hereby incorporated by reference in its entirety into the present application.

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to inductors. More specifically, embodiments of the invention relate to inductors configured to produce low value inductances at high frequencies.

2. Related Art

Inductors typically consist of a wire wrapped into a coil that resists change in current flowing through the wire. However, these traditional inductors are not suitable for providing stable high precision inductance standards for low inductance values.

As such, inductance is typically measured using an LCR (inductance, capacitance, resistance) meter that is calibrated using capacitance standards in which complex impedance values are converted into inductance. This method of calibration may be suitable for some ranges of inductance values but becomes inaccurate for inductances in the nanohenry range at high frequencies. Further, the extrapolation and conversion of such methods increases uncertainty in measured values. Further still, capacitors take too long to charge at high frequencies such that it becomes difficult to determine impedance using capacitor calibrated techniques for said frequencies. Specifically, high-value capacitors take a substantial amount of time to charge, therefore requiring lower frequencies to fully charge. As such, it becomes difficult to determine impedance using capacitor calibrated techniques at higher frequencies. Accordingly, what is needed is an inductor and calibration technique capable of producing and measuring inductances accurately at this range.

SUMMARY

Embodiments of the invention solve the above-mentioned problems by providing a low-value inductor that is stable at high frequencies. In some embodiments, the inductor includes a plurality of radial spokes extending between a first ring and a second concentric ring. Here, the inductance may be selected based on the number and dimensions of the plurality of spokes. In some embodiments, the inductor is a thin film network produced using a thin-film deposition technique.

A first embodiment of the invention is directed to an inductor comprising an inner ring, an outer concentric ring forming an outer perimeter, and a plurality of spokes extending radially from the inner ring to the outer ring, each of the plurality of spokes secured to the inner ring at a first end and secured to the outer ring at a second end, wherein the plurality of spokes provides an electrical resistance and a stable electrical inductance based at least in part on a number of spokes in the plurality of spokes, and wherein the inductor is configured to provide a nanohenry inductance value at a frequency equal to or greater than about 100 kilohertz.

A second embodiment of the invention is directed to a low value inductor system comprising a non-conductive base portion, and a conductive inductor portion disposed on a surface of the base portion comprising an inner ring, an outer concentric ring, and a plurality of equidistantly spaced spokes extending radially from the inner ring to the outer ring, each of the plurality of spokes secured to the inner ring at a first end and secured to the outer ring at a second end, the plurality of spokes providing an electrical resistance and a stable electrical inductance based at least in part on a number of spokes in the plurality of spokes.

A third embodiment of the invention is directed to a method for providing a low value inductor comprising determining one or more materials for the inductor based at least in part on an electrical conductivity, determining a number and one or more dimensions of a plurality of spokes to achieve a desired inductance for the inductor based at least in part on the one or more materials, depositing a first layer of the inductor onto a substrate surface, depositing a second layer of the inductor onto the first layer, and depositing a third layer of the inductor onto the second layer, wherein the inductor comprises an inner ring, a concentric outer ring, and a plurality of spokes extending radially from the inner ring to the outer ring, each of the plurality of spokes secured to the inner ring at a first end and secured to the outer ring at a second end, the plurality of spokes providing an electrical resistance and a stable electrical inductance based at least in part on the number of spokes in the plurality of spokes.

Additional embodiments of the invention are directed to methods of manufacturing a low value inductor including using a circuit tracing technique or thin film deposition technique to apply the inductor onto a substrate surface. In some such embodiments, the inductor may be applied as a plurality of material layers stacked upon each other.

Further, embodiments of the invention are directed to a method of manufacturing a low value inductor, the method comprising determining dimensions and a number of spokes in a plurality of spokes for the inductor based at least in part on a desired inductance for the inductor, depositing a first layer of the inductor onto a substrate surface, depositing a second layer of the inductor onto the first layer, and depositing a third layer of the inductor onto the second layer, wherein each layer comprises a predetermined thickness and a material for each layer is selected based on one of an electrical conductivity of the material or a connection property of the material.

Further still, embodiments of the invention are directed to methods of using a low value inductor to provide a low value inductance standard for calibrating an LCR meter.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
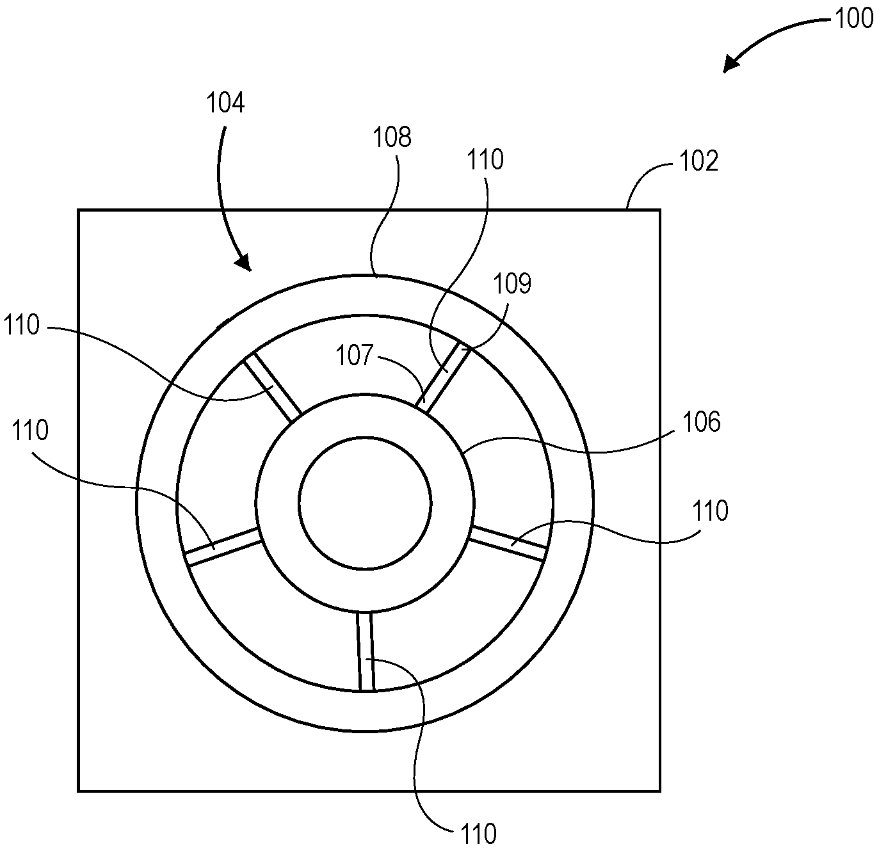
FIG. 1 depicts an inductor system relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an inductor system 100 is depicted relating to some embodiments of the invention. In some embodiments, the system 100 includes a base portion 102 and an inductor 104. In some such embodiments, the base portion 102 may comprise a ceramic or other non-conductive material. Alternatively, in some embodiments, the base portion 102 may comprise a semiconductor material such as silicon. In some embodiments, the inductor 104 may comprise a conductive material such as a metallic material. Further, in some embodiments, the inductor 104 may comprise a variety of different materials, as will be described in further detail below. In some embodiments, the inductor 104 comprises a thin film network including a corresponding sheet resistance based on the geometry of the thin film network.

In some embodiments, the inductor 104 provides an electrical inductance that may be used as an inductance standard for a measurement device as will be described in further detail below. Further, the inductor 104 may be used to provide an electrical inductance within various electronic devices and circuits. Accordingly, embodiments are contemplated in which the inductor 104 provides an electrical path while the base portion 102 is non-conductive. Here, the base portion 102 may function as a substrate providing structural support for the inductor 104.

In some embodiments, the inductor 104 comprises an inner ring 106, as shown. The inner ring 106 may be a circular ring disposed in a central portion of the inductor 104. The inductor 104 may further comprise an outer ring 108 disposed on an outer portion of the inductor 104. In some embodiments, the outer ring 108 is a circular ring which is comparatively larger than the inner ring 106 disposed on an outer perimeter of the inductor 104 and is disposed concentrically around the inner ring 106, as shown. The inductor 104 further comprises a plurality of spokes 110. In some embodiments, each of the spokes 110 may be radially disposed between the inner ring 106 and the outer ring 108. Here, the spokes 110 may be secured at a first end 107 to the inner ring 106 and at a second end 109 to the outer ring 108.

In some embodiments, the plurality of spokes 110 may be equidistantly spaced radially around the inner ring 106. In some embodiments, the plurality of spokes may be unevenly spaced. In some embodiments, the equidistant spacing of the spokes provides increased stability and reduces variability in the inductor 104 because the signal flow through the inductor 104 is distributed evenly through each of the spokes 110. For example, in some embodiments, a resonant frequency of the inductor 104 may be maintained by equidistantly spacing the spokes 110. In some embodiments, each of the spokes 110 provides an electrical connection between the inner ring 106 and the outer ring 108.

In some embodiments, the inductor 104 may be secured to the base portion 102 using a thin film deposition technique, such as sputtering. For example, in some embodiments, the inductor 104 may be sputtered onto a surface of the base portion 102. Here, a sputtering stencil may be used to control the geometry of the inductor 104. Accordingly, the sputtering stencil may include a cutout portion representing the final size and shape of the inductor 104 including the inner ring 106, the outer ring 108, and the plurality of spokes 110. Accordingly, each of the inner ring 106, the outer ring 108, and the plurality of spokes 110 may be part of a thin film network of the inductor 104. However, it should be understood that a variety of different processes may be used depending on the size of the inductor and the types of materials used for each of the inductor 104 and the base portion 102. For example, in some embodiments, the inductor 104 may comprise a copper material and may be produced as a circuit trace on a circuit board, as will be described in further detail below.

Figure 2B:
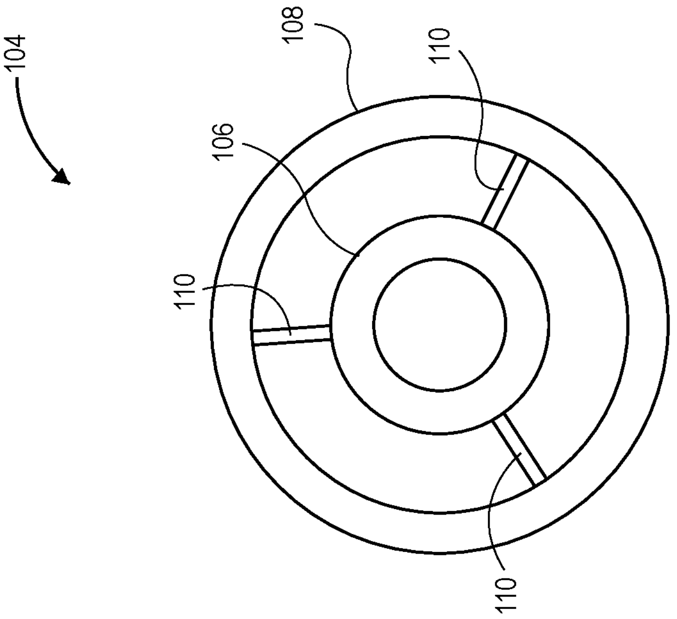
FIG. 2B depicts an inductor with three radial spokes relating to some embodiments of the invention.
Figure 2A:
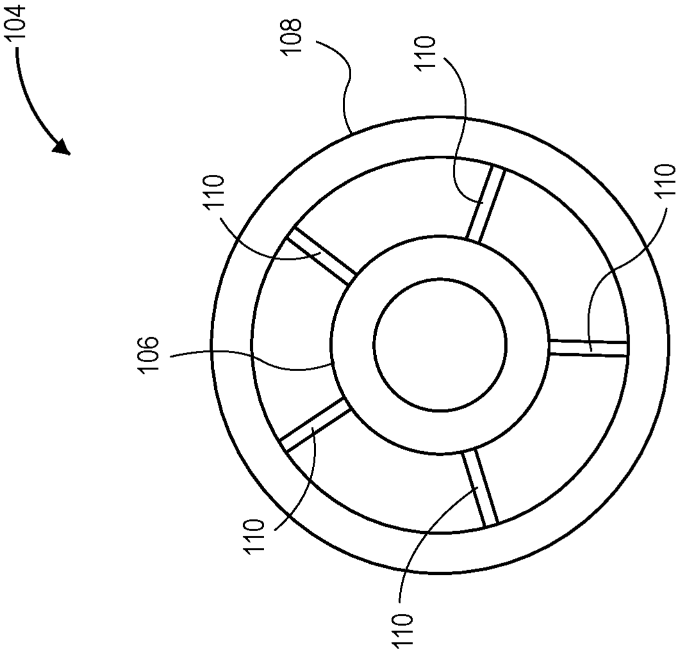
FIG. 2A depicts an inductor with five radial spokes relating to some embodiments of the invention.

Turning now to FIG. 2A, the inductor 104 is depicted relating to some embodiments of the invention. In some embodiments, the inductor 104 may include five spokes, as shown, extending radially outward from the inner ring 106 to the outer ring 108. In some embodiments, the number of spokes may be selected to achieve a specific resistance and inductance for the inductor 104. Here, the electrical resistance may be comparatively decreased by increasing the number of spokes and the electrical resistance may be increased by decreasing the number of spokes. Further, in some embodiments, the resistance and inductance of the inductor 104 may be further affected by the length and width of the spokes 110. In some embodiments, the spokes 110 may be cylindrical, rectangular, or another suitable shape. For example, embodiments are contemplated in which the spokes 110 may be conical. Further, in some embodiments, the shape of the spokes 110 may be selected based on the type of manufacturing process used to produce the spokes.

In some embodiments, each of the inner ring 106 and the outer ring 108 may comprise electrical nodes of the inductor 104. For example, in some embodiments, the inner ring 106 may provide a first node of the inductor 104 while the outer ring 108 provides a second node of the inductor 104. Accordingly, a signal path may be provided within the inductor 104 from the inner ring 106 through the plurality of spokes 110 into the outer ring 108. Here, the plurality of spokes 110 provide a plurality of parallel electrical paths between the nodes of the inductor 104. Accordingly, the electrical resistances of the plurality of spokes 110 are electrically parallel such that the overall electrical resistance and electrical inductance of the inductor 104 decreases as the number of spokes 110 increases. Further, embodiments are contemplated in which the signal path may be reversed such that the signal path starts at the outer ring 108 and travels through the spokes 110 to the inner ring 106. Accordingly, a signal may be provided as either of a current or voltage to the inductor 104.

In some embodiments, each of the plurality of spokes 110 may include specific dimensions. In some embodiments, the spokes 110 may be about 0.001 to about 0.003 inches wide. In some embodiments, the spokes 110 may be about 0.05 to about 0.2 inches long. In one embodiment, the spokes 110 are approximately 0.002 inches wide and approximately 0.102 inches long. In some such embodiments, the thickness and length of the spokes may affect the overall resistance and inductance of the inductor 104. For example, the resistance of the inductor 104 may increase as the thickness of the spokes 110 is decreased. In some embodiments, the spokes 110 may be cylindrical or rectangular. In some embodiments, the shape and specific dimensions of the spokes 110 may vary based on the material and the manufacturing process used to produce the spokes 110. Further, in some embodiments, the dimensions of the inductor 104 may be outside of the ranges described above. For example, the inductor 104 may be much smaller such that the inductor 104 can be disposed on a circuit board.

In some embodiments, the geometry of the inductor 104 acts as a simple transmission line providing an electrical path from the inner ring 106, through the plurality of spokes 110, and into the outer ring 108, such that impedance mismatch and de-embedding issues are avoided. In some embodiments, the inductor 104 is a thin film with a uniform thickness which provides a sheet resistance. In some embodiments, the sheet resistance of the inductor 104 corresponds to a desired inductance at a certain frequency. Here, the sheet resistance may be controlled at least in part by the number and dimensions of the spokes 110, as described herein.

Turning now to FIG. 2B, the inductor 104 is depicted relating to some embodiments of the invention. In some embodiments, the inductor 104 comprises a different number of spokes. For example, in some embodiments, the inductor 104 comprises three spokes 110, as shown. Further, embodiments are contemplated in which the inductor 104 comprises more or fewer spokes. For example, twenty-four spokes may be used to reduce the electrical resistance of the inductor 104. Further, in some embodiments, the electrical resistance and inductance may be varied by altering the size and/or shape of the spokes, as described above. Further, embodiments are contemplated in which the size and/or shape of the inner ring 106 and outer ring 108 may be altered.

Embodiments are contemplated in which the inductor 104 comprises a single spoke. Here, the single spoke does not provide a parallel electrical connection and thus will provide a comparatively higher resistance. In some such embodiments, if a single spoke is used, the overall shape of the inductor may be modified. For example, in some such embodiments, the outer and inner rings may be replaced with an electrical node disposed at each end of the single spoke. In some embodiments, the coaxial circular shape associated with the inductor 104 may be desirable to provide stability and reduce variability.

Figure 2C:
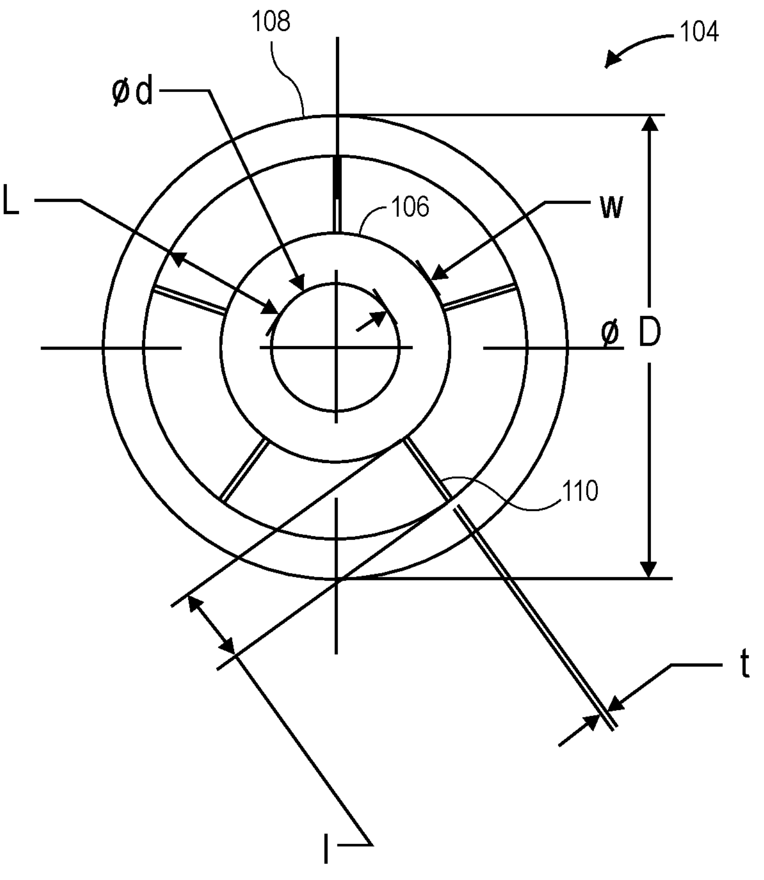
FIG. 2C depicts an inductor with corresponding dimensions relating to some embodiments of the invention.

Turning now to FIG. 2C, the inductor 104 is depicted showing various dimensions of the inductor 104 relating to some embodiments of the invention. In some embodiments, an outer diameter, D, of the outer ring 108 may be approximately 0.6150 inches. Alternatively, in some embodiments, the diameter, D, may be between about 0.5 inches and about 0.7 inches. An inner diameter, d, of the inner ring 106 may be approximately 0.1700 inches. Alternatively, in some embodiments, the diameter, d, may be between about 0.1 inches and about 0.2 inches. A length, L, between the inner surface of the inner ring 106 and the inner surface of the outer ring 108 may be approximately 0.1670 inches. In some embodiments, the length, L, may be between about 0.1 inches and about 0.2 inches. A width, w, of the inner ring 106 may be approximately 0.0700 inches. In some embodiments, the width, w, may be between about 0.05 inches and about 0.1 inches. Further, in some embodiments, the length, l, of the plurality of spokes 110 may be approximately 0.1020 inches. In some embodiments, the length, l, may be between about 0.05 inches and about 0.15 inches. The thickness, t, of each of the plurality of spokes 110 may be approximately 0.0020 inches. Alternatively, in some embodiments, the thickness, t, may be between about 0.001 inches and about 0.003 inches. In some embodiments, the diameter of the inner ring 106 may be about half the diameter of the outer ring 108.

In some embodiments, the dimensions of the inductor 104 may be similar to the values described above or at least within a given range such as within 0.0005 inches of the above-mentioned values. However, in some embodiments, it should be understood that the dimensions described above may be altered. For example, in some embodiments, the dimensions may be reduced such that the inductor is small enough to fit within a microchip or on a circuit board. Further, in other embodiments, the size of the inductor 104 may be increased. Further still, the ratios of the dimensions may be altered in some embodiments. For example, in some embodiments, the thickness, t, of the plurality of spokes 110 may be decreased to increase the electrical resistance of the inductor 104.

In some embodiments, each spoke of the plurality of spokes 110 may have a specific electrical resistance. For example, in some embodiments, each spoke may have an electrical resistance of about 0.502314 ohms such that the overall resistance is about 0.100463 ohms for an inductor 104 with five radially spaced parallel spokes. Accordingly, such an inductor 104 would have an inductance of about 15.989 nanohenrys at a frequency of 1 megahertz. In some embodiments, each spoke may have a resistance of about 0.4 ohms to about 0.6 ohms. In some embodiments, the overall resistance for the inductor may be about 0.05 ohms to about 0.3 ohms. In some embodiments, the inductance may be about 10 nanohenry to about 20 nanohenry at a frequency of about 0.5 MHz to about 1.5 MHz.

Figure 3:
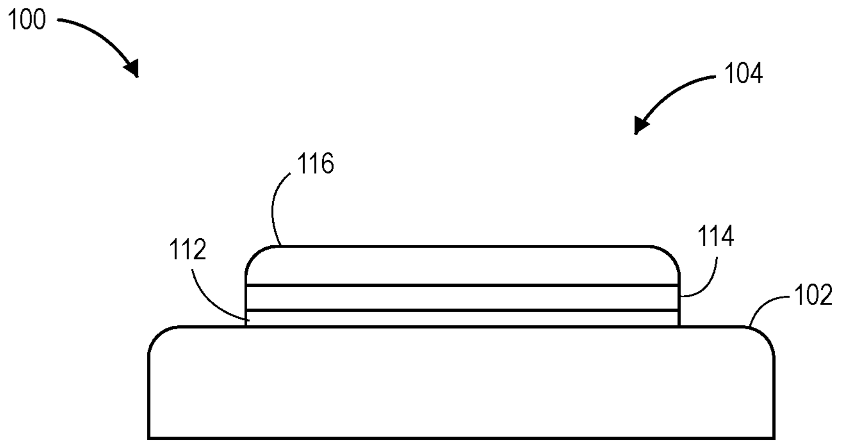
FIG. 3 depicts a side view of an inductor system relating to some embodiments of the invention.

Turning now to FIG. 3, a side view of the inductor system 100 is depicted relating to some embodiments of the invention. It should be understood that the illustration shown in FIG. 3 may include any combination of the inner ring 106, the outer ring 108, or the plurality of spokes 110. For example, in some embodiments, only the outer ring 108 may be visible from the side. In some embodiments, the inductor 104 may comprise a plurality of layers disposed on the base portion 102. For example, a first layer 112 may be disposed directly onto the base portion 102, as shown. Further, a second layer 114 may be disposed on the first layer 112. Further still, a third layer 116 may be disposed on the second layer 114. It should be understood that in some embodiments, more or fewer layers may be included. Further, various different materials may be used for each layer, as will be described in further detail below to achieve specific properties of the inductor 104.

In some embodiments, the first layer 112 may include a first material which may be selected based on a connection property of the first material to a material of the base portion. Accordingly, embodiments are contemplated in which a material of one or more of the layers of the inductor 104 are selected such that they adequately connect to the base portion 102 or to another layer of the inductor 104. Accordingly, in some embodiments, the first layer 112 may comprise a titanium tungsten material such that it adheres to the base portion 102 material, such as a ceramic material. Alternatively, in some embodiments, the base portion 102 may comprise a Flame Retardant 4 (FR4) material. In some embodiments, the second layer 114 may comprise a nickel material such that it adheres to the material of the first layer, such as a titanium tungsten material. In some embodiments, the third layer 116 may comprise a gold material such that it adheres to the material of the second layer, such as a nickel material. However, it should be understood that other materials may be used based on the material of the base portion 102, such as aluminum, copper, magnesium, tin, and other materials not explicitly described herein. Further, in some embodiments, the material of the layers may be selected based on a desired electrical conductivity for the inductor 104. For example, in some embodiments, it may be desirable to use a material comprising gold for at least one of the layers to provide electrical conductivity to the inductor 104. Alternatively, in some embodiments, other materials may be used to provide electrical conductivity such as copper or aluminum.

In some embodiments, gold may be used in the top-most layer (the third layer 116) to prevent rust from forming on the surface of the inductor 104. In some embodiments, other suitable rust preventative materials may be selected for the top-most layer. Further, in some embodiments, materials for the layers may be selected based on an atomical roughness of the materials. For example, chromium or titanium may be used to improve the film adhesion which provides increased contact area between the layers and the substrate surface. However, it should be understood that other materials may be used to improve the film adhesion. Additionally, in some embodiments, the combination of materials for the layers may be selected to improve the electrical properties of the inductor 104. For example, a layer comprising nickel may improve the electrical resistance and inductance of an adjacent layer comprising gold.

In some embodiments, the thickness of each layer may be selected to provide a specific electrical resistance. Further, in some embodiments, the thickness may be selected based on the type of material of the layer. In some embodiments, the first layer 112 may have a thickness of about 1 nm (0.03937 microinches) to about 100 nm (3.937 microinches). In some embodiments, the second layer 114 may have a thickness of about 4 microinches to about 12 microinches. In some embodiments, the third layer may have a thickness of about 50 microinches to about 100 microinches. In some embodiments, the second layer 114 is thicker than the first layer 112 and the third layer 116 is thicker than the second layer 114. For example, in some embodiments, the second layer 114 may be about 4 times thicker than the first layer 112 and the third layer 116 may be about 10 times thicker than the second layer 114. However, it should be understood that, in some embodiments, the thicknesses of the layers may be varied based on the specific materials used and the overall size and shape of the inductor 104.

For example, in some embodiments, the first layer 112 may include a titanium-tungsten alloy material having a thickness of around 50 nanometers (1.97 microinches), the second layer 114 may include a nickel material having a thickness of around 8 microinches, and the third layer 116 may include a gold material having thickness of around 80 microinches. However, embodiments are contemplated in which different thicknesses and materials may be used. Further, in some embodiments, more or fewer layers may be included. In some embodiments, the inductor 104 may include only a single layer. For example, embodiments are contemplated in which the inductor 104 includes a single conductive layer comprising a copper material.

Figure 4:
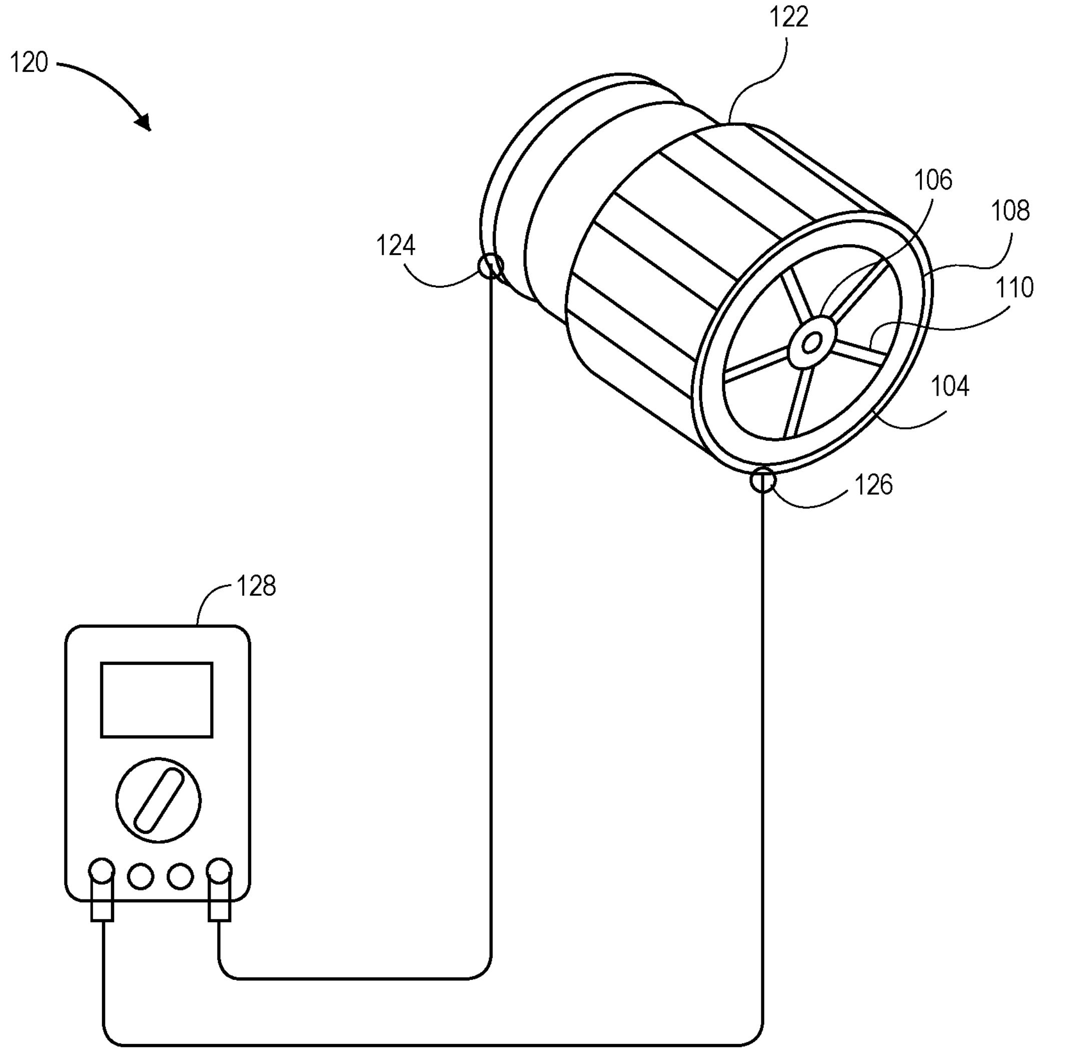
FIG. 4 depicts an exemplary measurement system relating to some embodiments of the invention.

Turning now to FIG. 4, an exemplary measurement system 120 is depicted relating to some embodiments of the invention. In some such embodiments, the inductor 104 may be included within an adapter 122, as shown. Here, the adapter 122 may be a high-frequency, precision electrical adapter which may interface with the inductor 104 and include a first electrical node 124 and a second electrical node 126, as shown. In some embodiments, the first electrical node 124 may be electrically coupled, for example, to the inner ring 106 of the inductor 104, while the second electrical node 126 may be electrically coupled to the outer ring 108 of the inductor 104. In some embodiments, the inductor 104 may be soldered onto the adapter 122. Accordingly, a sufficient electrical connection may be made between the inductor 104 and the adapter 122.

In some embodiments, the measurement system 120 may further include an LCR meter 128 for measuring an electrical inductance value. In some embodiments, the LCR meter 128 may be calibrated using the inductor 104. For example, the LCR meter 128 may be coupled to the adapter 122 at each of the first electrical node 124 and the second electrical node 126 such that an electrical signal path is provided through the inductor 104. Accordingly, the low value inductance of the inductor 104 may be used as a low-value inductance standard to calibrate the LCR meter 128.

In some embodiments, calibration of the LCR meter 128 with the inductor 104 allows inductance to be measured directly. Accordingly, the inductance can be measured without first measuring capacitance and converting to impedance. As such, the uncertainty in the measured value may be significantly reduced compared to methods in which an inductance value is determined by converting a capacitance value. Further, in some embodiments, radio frequency de-embedding may be avoided when using the inductor 104. In some embodiments, the use of the inductor 104 to calibrate the LCR meter 128 further improves the uncertainty since the inductance values can be measured directly and error is not propagated through calculation such as with capacitance calibration techniques.

Figure 5:
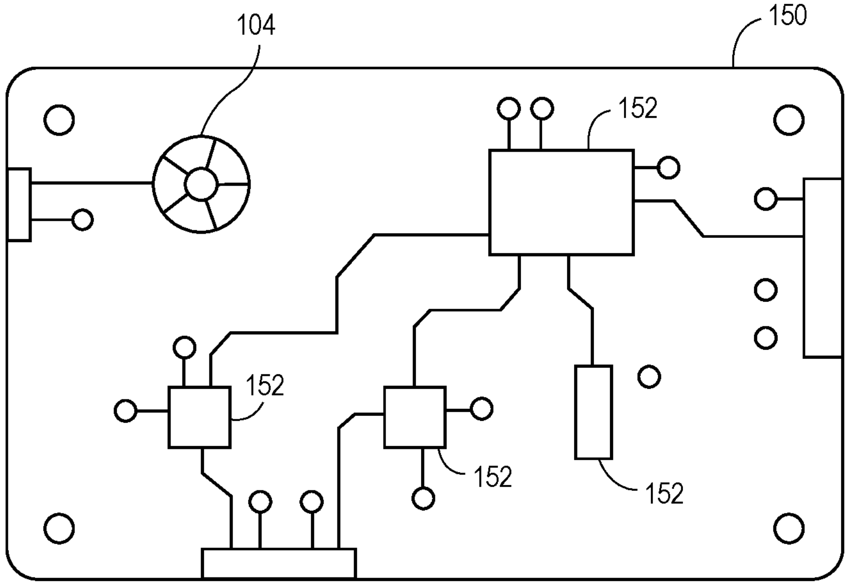
FIG. 5 depicts an exemplary circuit board relating to some embodiments of the invention.

Turning now to FIG. 5, an exemplary circuit board 150 is depicted relating to some embodiments of the invention. In some embodiments, the circuit board 150 may be a printed circuit board such as an integrated circuit of a microprocessor or a microchip. In some embodiments, the circuit board 150 may comprise a silicon base structure with a plurality of circuit components. In some embodiments, the inductor 104 is disposed onto a top surface of the circuit board 150, as shown. Accordingly, the inductor 104 may comprise a conductive metal trace. For example, the inductor 104 may be mounted onto the top surface of the circuit board 150 as a copper circuit trace.

In some embodiments, the inductor 104 may be applied using a thin film deposition technique such as a sputtering process. Alternatively, the inductor 104 may be applied using any other known technique suitable to mount the inductor 104 to the circuit board 150. In some embodiments, the inductor 104 may be produced as a circuit trace on the circuit board 150 using a subtractive process, such as etching, to remove excess copper and leave the copper trace of the inductor 104. It should be understood that a variety of different methods of applying the circuit trace are also contemplated, as well as a variety of other materials.

In some embodiments, the circuit board 150 further comprises one or more additional circuit components 152, as shown. The additional circuit components 152 may be any of a variety of electrical components, such as electrical sources, electrical loads, resistors, capacitors, additional inductors, and/or transistors. In some embodiments, the circuit components 152 may interface with additional circuit traces on the circuit board 150. Accordingly, embodiments are contemplated in which the same circuit trace material is used to produce both the inductor 104 and other circuit trace paths on the circuit board 150. In some such embodiments, the inductor 104 may be generated as part of the circuit tracing process.

It should be understood that the inductor 104 is not limited to use with printed circuit boards and that embodiments are contemplated in which the inductor 104 may be used in any other type of circuit or electronic device. For example, the inductor 104 may be wired into a circuit of an electronic device to provide a stable low value inductance within said electronic device. In some embodiments, the inductor 104 may be used as an energy storage device within an electrical circuit.

Figure 6:
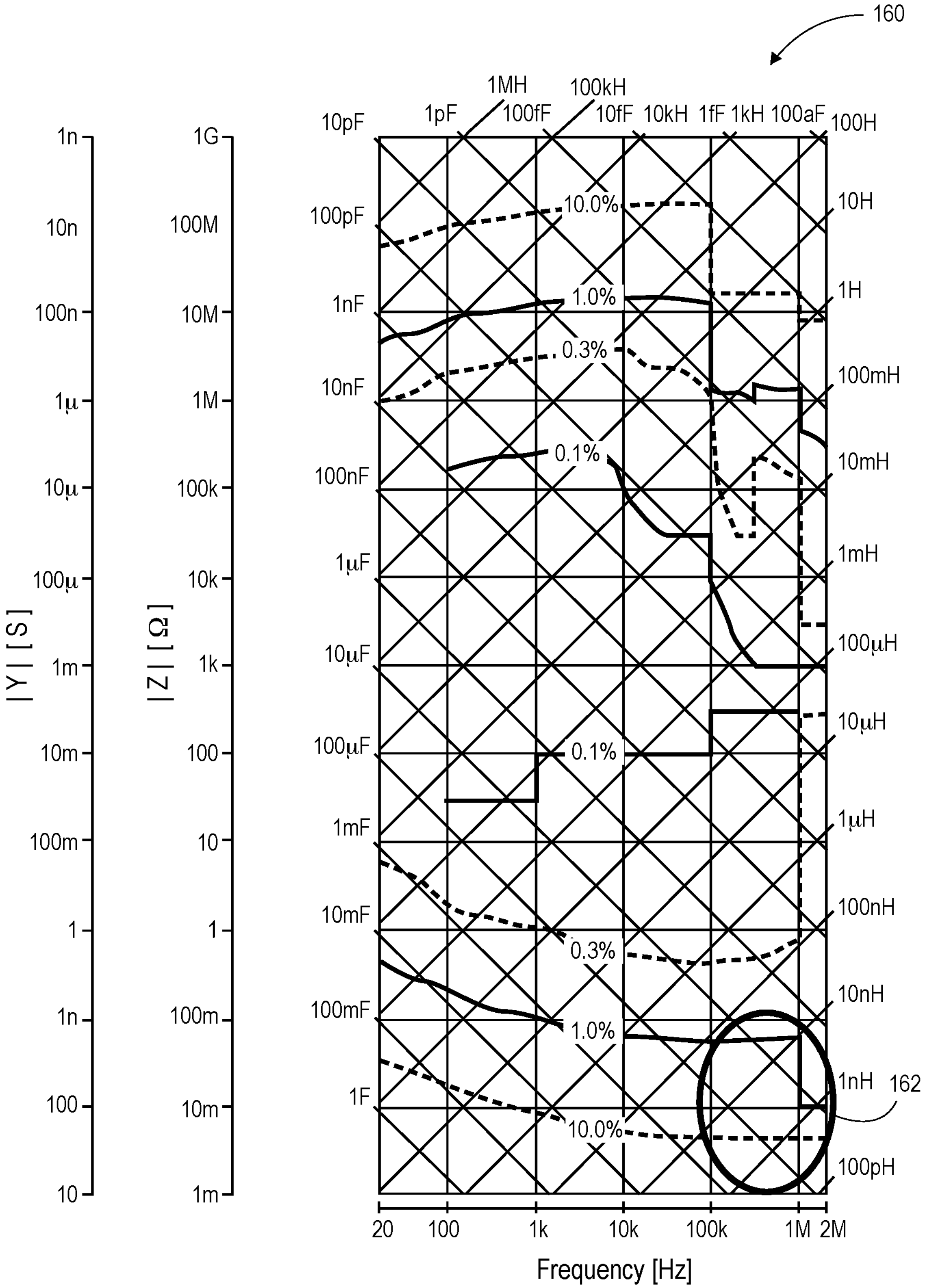
FIG. 6 depicts an impedance nomograph relating to some embodiments of the invention.

Turning now to FIG. 6, an impedance nomograph 160 is depicted relating to some embodiments of the invention. As shown, the impedance nomograph 160 shows the relationship between various electrical parameters including frequency, impedance, and inductance. In some embodiments, the nomograph 160 may include a logarithmic scale for one or more of the parameters, as shown. The impedance nomograph 160 includes a highlighted region 162 denoting a range of values for which it becomes difficult to accurately measure inductance using standard capacitance measurement techniques. Specifically, it may become difficult to measure low inductances such as in the nanohenry range below 100 nanohenrys at high frequencies such as at or over 100 kilohertz.

In some embodiments, the inductor 104 may be configured to produce an inductance value within the highlighted region 162. Accordingly, the inductor 104 may be used as an inductance standard to calibrate various measurement devices, as described above. In some embodiments, the nomograph 160 further includes an indication of the uncertainty of the impedance for a given value. In some embodiments, the uncertainty may be shown as a percentage value of the measured value.

Figure 7:
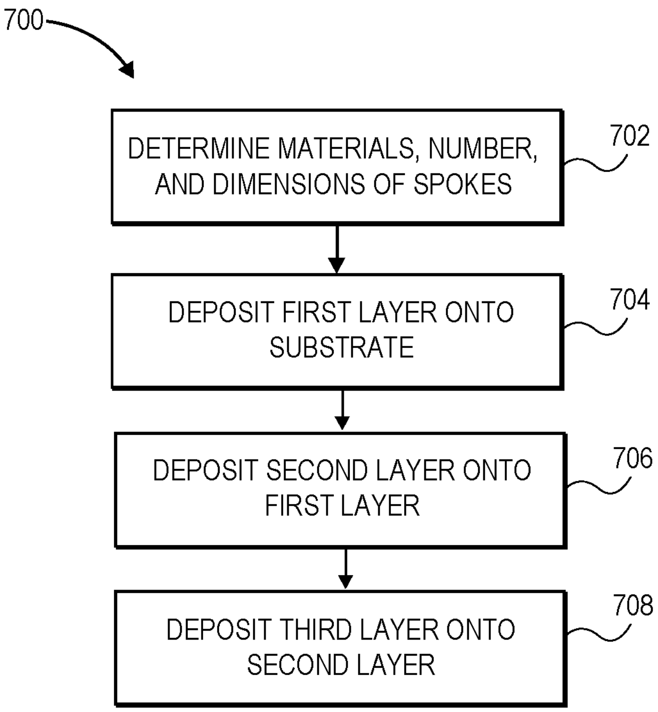
FIG. 7 depicts an exemplary method for manufacturing an inductor relating to some embodiments of the invention.

Turning now to FIG. 7, an exemplary method 700 for producing the inductor 104 is depicted relating to some embodiments of the invention. At step 702, the material of the inductor 104 (including each of the layers), a number of spokes and the dimensions of the plurality of spokes 110 is determined based on a desired inductance value. Accordingly, the number of spokes and the dimensions of the spokes may be selected to produce the desired inductance. In some embodiments, each of the plurality of spokes 110 has the same or substantially similar dimensions. Alternatively, embodiments are contemplated in which one or more of the spokes have different dimensions.

At step 704, the first layer 112 is deposited onto a substrate surface. In some embodiments, the substrate surface may be an upper surface of the base portion 102 which, in some embodiments, may be a ceramic. Alternatively, in some embodiments, the base portion 102 may comprise silicon or another suitable semiconductor material or insulator material. For example, printed circuit board substrates may include materials such as epoxy laminates, resin, reinforced fiberglass, or FR4, as described above. In some embodiments, quartz substrates are also contemplated. Accordingly, embodiments are contemplated in which the first layer 112 comprises a titanium tungsten material such that the first layer 112 adheres to the material of the base portion 102, as shown in FIG. 3. In some embodiments, the first layer 112 may be deposited onto the substrate surface via a sputtering process or any other suitable thin film deposition technique.

At step 706, the second layer 114 is deposited onto a top surface of the first layer 112. Here, the second layer 114 may comprise a nickel material such that it adequately adheres to the first layer 112. Similar to the first layer 112, the second layer 114 may be deposited via sputtering. At step 708, the third layer 116 is deposited onto a top surface of the second layer 114. In some embodiments, the third layer 116 is deposited using sputtering and the third layer 116 may comprise a gold material such that the third layer 116 adequately adheres to the material of the second layer 114.

It should be understood that, in some embodiments, various other techniques may be used to deposit the layers of the inductor 104. Further, embodiments are contemplated in which a plurality of different deposition techniques are used. For example, the first layer 112 may be deposited using a first process while the second layer 114 is deposited using a second process, and the third layer 116 may be deposited using a third process. Further still, the layers may be manufactured using subtractive methods such as etching, as described above.

In some embodiments, each of the layers may be deposited with a specific thickness. For example, embodiments are contemplated in which the first layer 112 has a first thickness, the second layer 114 has a second thickness distinct from the first thickness, and the third layer 116 has a third thickness distinct from the first and second thicknesses. In some embodiments, the thickness of each layer may be selected based on the type of materials used and the desired inductance value for the inductor 104. For example, in some embodiments, the first layer 112 may have a minimum thickness of about 50 nanometers such that the nickel material of the second layer 114 is able to adhere to the titanium tungsten material of the first layer 112. However, it should be understood that various other materials may be used.

In some embodiments, the inductor 104 produces a low value inductance in the nanohenry range (i.e., at or below 100 nanohenrys) for a corresponding high frequency (i.e., at or above 100 kilohertz). In some embodiments, the low value inductance is associated with the electrical resistance from the plurality of spokes 110. Accordingly, the inductance of the inductor 104 may be controlled by varying any combination of the number of spokes in the plurality of spokes 110, the length and width of the spokes, or the material of the inductor 104.

It should be understood that the inductor 104, as described herein, may be used in a variety of different applications such in metrology labs to provide a high stability precision low value inductance standard for calibration and measurement techniques, in various industries including military, automotive, and aerospace to provide a low value inductor, and in microelectronics to provide a small-scale inductor, for example, placed on a circuit board or within a microchip, as described above. Further, the inductor 104 may be used in any suitable application that requires an accurate surface-mounted inductor.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An inductor device comprising:
- an inner ring, the inner ring comprising a complete inner circular shape;
- an outer ring forming an outer perimeter concentrically around the inner ring, the outer ring comprising a complete outer circular shape; and
- a plurality of spokes extending radially from the inner ring to the outer ring, each of the plurality of spokes secured to the inner ring at a first end and secured to the outer ring at a second end,
- wherein the plurality of spokes provides a respective plurality of parallel electrical paths between the inner ring and the outer ring,
- wherein the plurality of spokes provides an electrical resistance and a stable electrical inductance based at least in part on a number of spokes in the plurality of spokes,
- wherein the electrical resistance and the stable electrical inductance decreases as the number of spokes in the plurality of spokes increases.

2. The inductor device of claim 1, wherein the inductor device is configured to provide a nanohenry inductance value.

3. The inductor device of claim 2, wherein the nanohenry inductance value is provided at a frequency equal to or greater than about 100 kilohertz.

4. The inductor device of claim 1, wherein the plurality of spokes is equidistantly spaced about a circumference of the inner ring.

5. The inductor device of claim 4, wherein the plurality of spokes comprises five spokes.

6. The inductor device of claim 1, wherein the inductor device is disposed on an inductor base portion.

7. The inductor device of claim 1, wherein the inductor device is configured to provide a low value inductance for calibrating an inductance, capacitance, resistance (LCR) meter.

8. An inductor device comprising:
- an inner ring, the inner ring comprising a complete inner circular shape;
- an outer ring forming an outer perimeter concentrically around the inner ring, the outer ring comprising a complete outer circular shape; and
- a plurality of spokes extending radially from the inner ring to the outer ring, each of the plurality of spokes secured to the inner ring at a first end and secured to the outer ring at a second end,
- wherein the plurality of spokes provides a respective plurality of parallel electrical paths between the inner ring and the outer ring,
- wherein each of the inner ring, the outer ring, and the plurality of spokes is electrically conductive.

9. The inductor device of claim 8, wherein each of the inner ring, the outer ring, and the plurality of spokes are disposed on a surface of a non-conductive substrate.

10. The inductor device of claim 9, wherein each of the inner ring, the outer ring, and the plurality of spokes comprises a plurality of layers disposed external to the surface of the non-conductive substrate, and wherein each of the plurality of layers comprises a distinct thickness.

11. The inductor device of claim 9, wherein the inner ring, the outer ring, and the plurality of spokes are configured to adhere to a flame retardant material of the surface of the non-conductive substrate.

12. The inductor device of claim 8, wherein the plurality of spokes comprises three spokes.

13. The inductor device of claim 8, wherein each of the plurality of spokes comprises a similar thickness.

14. The inductor device of claim 13, wherein an electrical resistance of the inductor device is determined based at least in part on the similar thickness of the plurality of spokes.

15. An inductor device configured to be disposed onto a surface of a non-conductive substrate, the inductor device comprising:
- an inner ring, the inner ring comprising a complete inner circular shape;
- an outer ring forming an outer perimeter concentrically around the inner ring, the outer ring comprising a complete outer circular shape; and
- a plurality of spokes extending radially from the inner ring to the outer ring, each of the plurality of spokes secured to the inner ring at a first end and secured to the outer ring at a second end,
- wherein the plurality of spokes provides a respective plurality of parallel electrical paths between the inner ring and the outer ring,
- wherein each of the inner ring, the outer ring, and the plurality of spokes is electrically conductive.

16. The inductor device of claim 15, wherein each of the inner ring, the outer ring, and the plurality of spokes comprises a plurality of layers disposed external to the surface of the non-conductive substrate.

17. The inductor device of claim 16, wherein the plurality of layers comprises:
- a first layer comprising a first material disposed on the surface of the non-conductive substrate; and a second layer comprising a second material disposed on the first layer.

18. The inductor device of claim 17, wherein the plurality of layers further comprises:

a third layer comprising a third material disposed on the second layer.

19. The inductor device of claim 18, wherein the first material is titanium tungsten, the second material is nickel, and the third material is gold.

20. The inductor device of claim 19, wherein the third layer is configured to prevent rust from forming on the inductor device.

* * * * *